J. W. H. DOUBLER.
Grain-Drill.
No. 41,811. Patented Mar. 1, 1864.
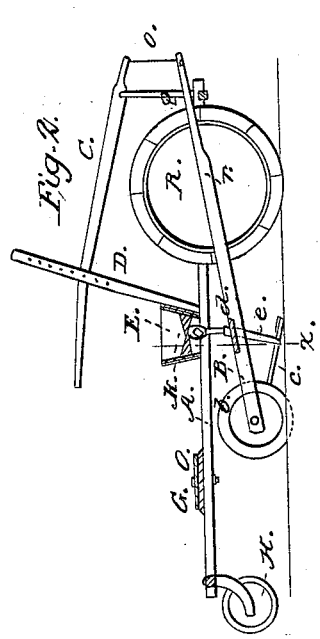
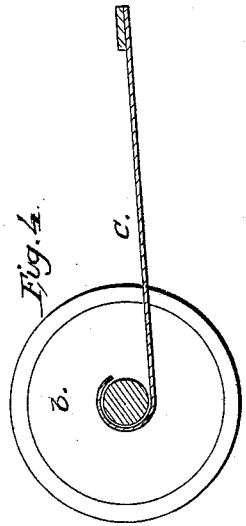
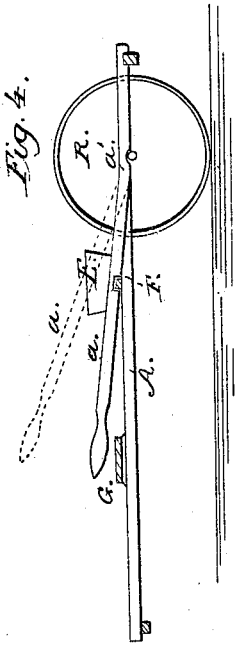
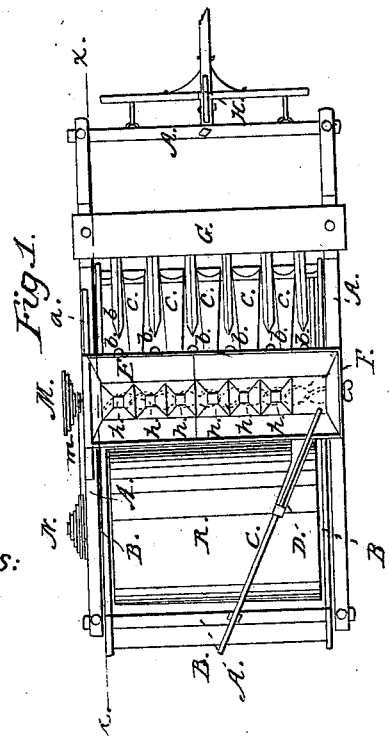
Witnesses:
W. E. Maus
Al. Ballard.
Inventor:
J. W. H. Doubler.

UNITED STATES PATENT OFFICE.

J. W. H. DOUBLER, OF WARREN, ILLINOIS, ASSIGNOR TO HIMSELF AND JOHN E. WYNNE, OF SAME PLACE.

IMPROVEMENT IN GRAIN-DRILLS.

Specification forming part of Letters Patent No. 41,811, dated March 1, 1864.

*To all whom it may concern:*

Be it known that I, J. W. H. DOUBLER, of Warren, in the county of Jo Daviess and State of Illinois, have invented certain new and useful Improvements in Grain-Drills; and I do hereby declare that the following is a full, clear, and exact description thereof, reference being had to the accompanying drawings and the letters and figures of reference marked thereon, which form a part of this specification.

In the said drawings, Figure 1 represents a plan or top view of my invention. Fig. 2 shows a longitudinal vertical section of the same at the line $x$ in Fig. 1; Fig. 3, a transverse sectional view thereof at the line $x$ in Fig. 2; and Fig. 4 in Plate B represents a side view of the bar $a$, hereinafter described, and a cross-section of that part of the shaft F upon which said bar rests.

My invention has reference to that class of seeding-machines which deposit the seed in furrows or drills; and it consists in a novel device for marking said furrows or drills, and in adjusting the same so as to make said drills of any required depth; in a novel arrangement for regulating and controlling the discharge of the seed from the hopper, and in other improvements hereinafter to be specified and described.

To enable those skilled in the art to construct and use my invention, I will now proceed to describe the same with particularity.

A in the said drawings represents the frame of the machine, supported behind upon the shaft or fixed axle of the roller R, and in front resting upon the wheel marked H, which is supported by the bent arm I, the upper end of which arm, passing vertically through the frame A, revolves upon a circular bearing in said frame, so as to adapt the said wheel to any required direction, thus enabling the machine to be readily turned about.

My device for marking the drills or furrows wherein the seed is deposited consists of a series of wheels or narrow circular rollers, (marked $b$ in the drawings,) which are provided with cutting-edges, so as more readily to enter the ground, and arranged at a suitable distance from each other upon an axle whose ends are supported upon bearings in the arms B, as shown in the drawings; or the said circular drills may be made to revolve upon their axle, said axle being fixed in the arms D, and may be adjustable upon said axle, so as to mark the drills at different distances apart.

Across the arms B, directly beneath the hopper, is fastened a wide cross-bar, (marked $d$,) in which are fixed the upper ends of the tubes or conductors $e'$, which are arranged directly behind the said circular drills $b$. By this arrangement the tubes $e'$ may be raised or lowered at the desire of the operator, as well as the circular drills $b$, in the manner hereinafter to be described.

The arms B are supported upon $r$, the fixed shaft of the roller R, and are connected at their rear ends by the cross-bar B', which is connected by the rod $o$ to the end of the lever C, whose fulcrum $p$ rests upon the rear end of the frame A, as clearly shown in the drawings. By this arrangement the operator, by means of the lever C, which extends over the hopper whose lid or cover forms his seat, can raise or lower the circular drills $b$ and the tubes $e'$ at pleasure, so as to make the drills cut deep or shallow furrows, or may raise them clear from the ground when moving with the machine from one place to another, and adjust them there by means of the perforated upright D and a suitable pin.

Between the circular drills $b$ there are attached to the axle the fingers $c$, extending backward to the rear of the tubes, the rear ends thereof dragging upon the ground, across which ends is placed a heavy bar to keep them down, and to cover the grain in the drills. These fingers also serve as scrapers to clean the circular drills $b$ from earth and mud, and prevent their becoming clogged, so as to perform their work imperfectly.

The hopper E is provided with a double bottom, between which there extends throughout its entire length an auger-shaped rod or spiral, (marked F,) which is revolved by means of the pulleys M upon the end thereof and N upon the axle of the roller R and the band $m$. Through that bottom of the hopper which lies above the said spiral rod perforations marked $h$ are made, through which the grain falls upon said spiral, and through the bottom, below said spiral, other perforations are made, opening into the tubes $e$, through which the grain is conducted into the drills. As the spiral F revolves in a circular box or journal exactly fitting it, this arrangement operates as follows: As the spiral F revolves it conveys through its spiral channels a certain quantity of grain to each of said perforations, opening into the tubes aforesaid, to be deposited in the furrows prepared by the circular drills b, the quantity of grain thus conveyed, as aforesaid, depending upon the rapidity with which said spiral revolves. By means of the arrangement of the gang-pulleys M and N the number of revolutions of the spiral regulator while the machine moves over a given space may be increased or diminished, so that the exact quantity of grain required may be deposited in the drills.

In Fig. 1, a represents a bar fixed upon a pivot at a', so that the other end may be elevated or depressed. In the lower side of this bar, directly over the shaft of F, lying outside of the frame, that part of the shaft being of a rectangular form, a notch is made which exactly fits upon said rectangular shaft. By this arrangement, when the bar a is dropped upon said shaft the revolution of F is at once stopped, the belt m slipping upon the pulleys, and the escape of the seed from the hopper can thus be checked when desired.

I claim—

1. The combination and arrangement of the adjustable circular drills b, the scrapers c, arm B, and lever C, arranged and operating as and for the purposes delineated and described.

2. The scrapers c, arranged in combination with the circular drills b, and operating as and for the purposes set forth.

3. The combination and arrangement of the circular drills b, the scrapers c, the tubes e, spiral shaft F, and roller R, arranged and operating as and for the purposes herein delineated and described.

J. W. H. DOUBLER.

Witnesses:
W. E. MARRS,
A. C. BALLARD.